United States Patent [19]

Spies et al.

[11] Patent Number: 5,624,751

[45] Date of Patent: Apr. 29, 1997

[54] REPULPABLE CARTON SEALING TAPE

[75] Inventors: Manfred Spies, Biedenkopf; Peter Gleichenhagen, Hamburg; Herbert Knolle, Reinbek; Robert Meyer; Andreas Westphal, both of Hamburg, all of Germany

[73] Assignee: Beiersdorf Aktiengesellschaft, Hamburg, Germany

[21] Appl. No.: 299,779

[22] Filed: Sep. 1, 1994

[30] Foreign Application Priority Data

Sep. 8, 1993 [DE] Germany .................. 43 30 362.5

[51] Int. Cl.$^6$ ...................................... B32B 7/12
[52] U.S. Cl. .................. 428/355 AC; 428/474.4; 428/343; 428/350; 428/511; 526/318.4
[58] Field of Search ................... 428/343, 474.4, 428/350, 355, 511; 526/318.4

[56] References Cited

U.S. PATENT DOCUMENTS

| 5,196,504 | 3/1993 | Scholz et al. | 526/318.4 |
| 5,350,630 | 9/1994 | Schreiner et al. | 428/343 |

*Primary Examiner*—Edith Buffalow
*Attorney, Agent, or Firm*—Sprung Horn Kramer & Woods

[57] ABSTRACT

Use of a paper carrier for the production of a repulpable carton sealing tape which is finished on one side with a repulpable self-adhesive composition and on the other side with a repulpable silicone-free release based on a copolymer of amide/styrene together with a film-forming agent.

9 Claims, No Drawings

REPULPABLE CARTON SEALING TAPE

DESCRIPTION

The invention relates to the use of a paper carrier for the production of a repulpable carton sealing tape.

Carton sealing tapes have been known for a long time and are widely used. However, since the requirements of packaging based on paper/cardboard are increasingly that they are to be repulpable and thus should not interfere with the large-scale production processes via contamination of the finished pulp, this requirement now also applies to the carton sealing tapes used on such materials.

Repulpable self-adhesive compositions are already known, for instance from DE-A 23 60 441, DE-C 31 05 894 and DE-A 33 18 600. These and similar self-adhesive compositions are entirely suitable for the abovementioned purpose.

However, coating of the reverse side of such adhesive tapes presents difficulties. So that such an adhesive tape does not stick to itself when wound to a roll, it is usual to provide the reverse side with a release, in particular with compounds based on silicone. However, these cause trouble in the finished pulp and paper factories have problems with such raw materials.

On the other hand, it has been found that known and commercially available silicone-free release systems do not produce the desired results, and above all are inadequate in respect of their release action in combination with highly polar water-soluble adhesive compositions, so that the result is irreversible sticking of the rolls of adhesive tape, breaks during peeling from the roll and also unacceptably high peel forces needed to peel such an adhesive tape from the roll.

German Utility Model G 92 04 740 (analogous to DE 42 11 510 A1) has already disclosed a recyclable and printable carton sealing tape paper which is provided with a release system and can be finished with a preliminary coating. The acrylate dispersions employed as the release may be adequate for recycling, but are not functional in combination with water-soluble adhesive compositions, and in particular are unsuitable for repulping.

The object of the invention was to provide a remedy here, in particular to provide a repulpable carton sealing tape which does not have the disadvantages of the prior art, or at least does not have them to this extent, and which nevertheless can be repulped without problems.

This object is achieved by the use of a paper carrier which is finished as described in the patent claims.

Carrier materials (papers)

Possible carrier materials are essentially highly sized papers which can be produced by the Clupak process and are fully repulpable. Papers having different weights per unit area can be employed, depending on the use. Weights per unit: area in a range between 50 and 100 g/m² are preferred for packaging tapes. Because of the fact that certain tensile forces are exerted on the carrier material during use as packaging tape, it must be ensured that the corresponding strength in the longitudinal and transverse direction exists. The creping of the carrier material and the associated extension can be varied during production.

The highly sized papers produced by the Clupak process which are preferably employed meet the desired requirements in full. Both papers with a higher longitudinal extensibility than transverse extensibility and papers with a higher transverse extensibility than longitudinal extensibility, in both the bleached and the environment-friendly unbleached version, can be employed, depending on the desired use.

Adhesive compositions

Adhesive compositions which can be used are the customary repulpable systems as described in the patent literature (compare, for example, DE 23 60 441 A1, DE 31 05 894 C2, DE 33 18 600 A1). These adhesive compositions comprise, in particular, certain matrix polymers based on acrylic acid and other comonomers and a sometimes considerable content of plasticizers or resins. The addition of plasticizer or resin means that the matrix polymers, which are often non-adhesive or only slightly adhesive, acquire adhesive properties. If contact occurs between the adhesive composition and the reverse side of the carrier during production of roll goods, this contact leads to an undesirable sticking if no release system is used.

Silicone-containing systems are usually used as release agents for repulpable self-adhesive compositions, which are usually polar in nature. The known silicone-free release agents frequently fail in association with polar water-soluble adhesive compositions. The present invention closes this gap. In many cases of the use of pressure-sensitive adhesive tapes, a defined residual adhesion between the adhesive composition and the release system is desirable. The unwinding forces can be adjusted in a defined manner by varying the plasticizer systems and the ratios of the release constituents.

Release systems

Because of the fact that the interaction between the adhesive composition and the reverse side of the adhesive tape is too great, the carrier material must be finished with a release system on the reverse side. The requirements of such a release system are diverse. In addition to the release action, it must have a good repulpability, so that the adhesive tape can be reprocessed without problems. Printability is also a requirement which is not to be ignored for certain uses, and is not adequately met by silicone-containing systems.

If, according to DE 28 45 541, copolymers of amide/styrene, in particular N-stearylmaleamide and styrene, mixed with film-forming agents, in particular polyvinyl alcohols of various molecular weights and degrees of hydrolysis, are employed, release systems are obtained which prove to be fully functional in combination with customary water-soluble adhesive compositions having a polar character and furthermore are outstandingly printable and repulpable. The polyvinyl alcohol serves here as a film-forming agent and furthermore prevents too severe a penetration of the release system into the carrier material, which is often absorbent.

Film-forming agents which can be employed are polyvinyl alcohols having a molecular weight of about 1000 to 400,000, preferably 2000 to 150,000. Release systems with polyvinyl alcohols of low molecular weight have a greater tendency to penetrate into an absorbent carrier material than higher molecular weight variants. Mixtures of polyvinyl alcohols of different molecular weight can likewise be employed successfully. The degree of hydrolysis of the polyvinyl alcohols used can be varied.

The content of polyvinyl alcohol in combinations with the copolymers mentioned, in particular those of N-stearylmaleamide and styrene, can be varied in a range between 5 and 95%, based on the solids content, preferably between 25 and 65%, depending on the adhesive composition used.

The weight of release system applied is, in particular, in a range between 0.5 and 15 g, preferably in a range between 2 g and 6 g.

The aim of the embodiment examples below is to illustrate the invention without limiting it unnecessarily.

EXAMPLE 1

Coating 6.5 kg of a 30% strength aqueous dispersion of a copolymer of N-stearylmaleamide and styrene according to DE 28 45 541 and 3.5 kg of a 30% strength aqueous solution of Polyviol VO3.140 (polyvinyl alcohol from Wacker, Pn≈300) are thoroughly homogenized in a vessel of 20 l capacity. The silicone-free, fully repulpable release layer thus obtained is applied continuously by full coating in a layer thickness of about 3–5 g/m² to a highly sized paper carrier produced by the Clupak process (Wisaforest, unbleached, carrier weight 65 g/m²).

To counteract corrugation of the carrier material, the non-coated side is moistened with water by several jets lying side by side (about 0.5 l/hour, based on one jet) before the coating operation.

Technical conditions:

Machine data: Channel coating machine with rubber blanket doctor

Doctor blade: 4 mm

Carrier web speed: 50 m/minute

The carrier material coated with the release coating is then dried thermally in 10 different drying channels.

(Drying temperature: 2×100° C., 2×120° C., 2×140° C., 4×160° C.).

After-coating:

In a second operation, the coated carrier material is coated on the non-coated side with a customary repulpable self-adhesive composition as described, for example, in DE 23 60 441, DE 33 18 600 or DE 31 05 894. For this, 5.99 kg of a 30% strength matrix polymer of 47% of acrylic acid, 48% of butyl acrylate and 5% of vinylcaprolactam, which has been polymerized by free radical polymerization, are mixed in benzine/acetone with 3.97 kg of Ethomeen C-25 (Akzo) and 0.029 kg of aluminium chelate in a vessel of 20 l capacity. The pressure-sensitive adhesive composition thus prepared is applied as a 30% strength solution in benzine/acetone in a layer thickness of about 40–50 g/m² to the non-coated side of the carrier material.

Technical conditions:

Machine data: Curtain coating unit

Coating setting: 183 scale divisions

Carrier web speed: 50 m/minute

The adhesive composition is then dried and crosslinked thermally in 4 different drying channels.

(Drying temperature: preliminary channel 50° C., zone 1 70° C., zone 2 80° C., zone 3 90° C., zone 4 90° C.).

A product which can be wound to a roll and also unwound from this again without problems in a manner desired for a packaging tape is thus obtained.

The resulting product proves to be fully repulpable in accordance with the test method Tappi UM 213 A.

EXAMPLE 2

Coating:

7.5 kg of a 30% strength aqueous dispersion of a copolymer of N-stearylmaleamide and styrene according to DE 28 45 541 and 3.75 kg of a 20% strength aqueous solution of Mowiol 18–88 (polyvinyl alcohol from Hoechst, Pn≈2700) are mixed thoroughly in a vessel of 20 l capacity. The silicone-free, fully repulpable release layer thus obtained is applied continuously by full coating in a layer thickness of about 4 g/m² to a highly sized paper carrier produced by the Clupak process (Wisaforest, bleached, carrier weight 85 g/m²).

To counteract corrugation of the carrier material, the non-coated side is moistened with water by several jets lying side by side (about 0.5 l/hour, based on one jet) before the coating operation.

Technical conditions:

Machine data: Cylinder coating machine

Doctor blade: 3 mm

Carrier web speed: 25 m/minute

The carrier material coated with the release coating is dried by means of a cylinder thermostatically controlled at 100° C. (diameter 2.5 mm).

After-coating:

In a second operation, the carrier material is coated with a repulpable self-adhesive composition on the non-coated side. For this, 5.99 kg of a 30% strength matrix polymer of 47% of acrylic acid, 48% of butyl acrylate and 5% of vinylcaprolactam, which has been polymerized by free radical polymerization, is mixed in benzine/acetone with 3.97 kg of Ethomeen C-25 (Akzo) and 0.029 kg of aluminium chelate in a vessel of 20 l capacity. The pressure-sensitive adhesive composition thus prepared is applied as 35% strength solution in benzine/acetone with a layer thickness of about 40 g/m² to the non-coated side of the carrier material.

Technical conditions:

Machine data: Curtain coating unit

Coating setting: 183 scale divisions

Carrier web speed: 40 m/minute

The adhesive composition is then dried and cross-linked thermally in 4 different drying channels.

Drying temperature: preliminary channel 50° C., zone 1 70° C., zone 2 80° C., zone 3 90° C., zone 4 90° C.

We claim:

1. In the cycle comprising making a paper based carton sealing tape, re-cycling tape, and re-pulping, the improvement wherein such tape is finished on one side with a repulpable self-adhesive composition and on the other side with a N-stearylmaleamide/styrene repulpable silicone-free release based on a copolymer together with a film-forming agent.

2. The method according to claim 1, characterized in that the film-forming agent is a polyvinyl alcohol.

3. The method according to claim 1, characterized in that the paper carrier has a higher transverse extensibility than longitudinal extensibility.

4. The method according to claim 1, characterized in that the paper carrier has a higher longitudinal extensibility than transverse extensibility.

5. The method according to claim 1, characterized in that a paper carrier of highly sized paper is employed.

6. The method according to claim 1, characterized in that the repulpable self-adhesive composition comprises a water soluble acrylate.

7. The method according to claim 1, characterized in that the release-coated side can be written on and/or printed.

8. Repulpable carton sealing tape comprising a paper carrier which is finished on one side with a repulpable self-adhesive composition and on the other side with a repulpable, silicone-free release based on a N-stearylmaleamide/styrene copolymer together with a film-forming agent.

9. The method according to claim 6, wherein the water-soluble acrylate is polar.

* * * * *